United States Patent
Miller et al.

(10) Patent No.: US 8,800,703 B2
(45) Date of Patent: Aug. 12, 2014

(54) HOOD MOUNT ASSEMBLY

(75) Inventors: Kyle T. Miller, Seattle, WA (US); Casey W. Keil, Renton, WA (US); Michael J. Fanning, Renton, WA (US); Steven L. Baker, Duvall, WA (US)

(73) Assignee: PACCAR Inc, Bellevue, WA (US)

( * ) Notice: Subject to any disclaimer, the term of this patent is extended or adjusted under 35 U.S.C. 154(b) by 103 days.

(21) Appl. No.: 13/196,797

(22) Filed: Aug. 2, 2011

(65) Prior Publication Data
US 2013/0025954 A1    Jan. 31, 2013

Related U.S. Application Data

(60) Provisional application No. 61/511,981, filed on Jul. 26, 2011.

(51) Int. Cl.
*B62D 25/12* (2006.01)

(52) U.S. Cl.
USPC ........................................ 180/69.21; 180/69.2

(58) Field of Classification Search
USPC .............................................. 180/69.2, 69.21
See application file for complete search history.

(56) References Cited

U.S. PATENT DOCUMENTS

| | | | | |
|---|---|---|---|---|
| 3,338,326 A | | 8/1967 | Hafer | |
| 3,419,099 A | * | 12/1968 | Brumbaugh et al. | 180/69.24 |
| 4,603,798 A | | 8/1986 | Griswold | |
| 4,973,097 A | * | 11/1990 | Hosan et al. | 296/76 |
| 4,991,675 A | * | 2/1991 | Tosconi et al. | 180/69.21 |
| 5,054,567 A | | 10/1991 | Hoffman | |
| 5,101,921 A | * | 4/1992 | West et al. | 180/69.21 |
| 5,730,240 A | * | 3/1998 | Hoffman et al. | 180/69.21 |
| 5,890,556 A | * | 4/1999 | Shearn et al. | 180/69.21 |
| 5,975,228 A | * | 11/1999 | Parfitt | 180/69.21 |
| 6,073,714 A | * | 6/2000 | McHorse et al. | 180/89.14 |
| 6,116,366 A | | 9/2000 | Creswick | |
| 6,394,211 B1 | * | 5/2002 | Palenchar et al. | 180/69.21 |
| 6,637,531 B2 | * | 10/2003 | Palenchar et al. | 180/69.21 |
| 6,666,291 B2 | | 12/2003 | Hyslop | |

(Continued)

FOREIGN PATENT DOCUMENTS

| | | |
|---|---|---|
| CA | 2036599 A1 | 5/1992 |
| JP | 2001-191958 A | 7/2001 |

OTHER PUBLICATIONS

International Search Report and Written Opinion mailed May 31, 2013, issued in corresponding International Application No. PCT/US2011/045432, filed Jul. 26, 2011, 10 pages.

*Primary Examiner* — Jeffrey J Restifo
(74) *Attorney, Agent, or Firm* — Christensen O'Connor Johnson Kindness PLLC

(57) ABSTRACT

A hood mount assembly for positioning and mounting a hood to a vehicle having a frame and a cab, wherein the hood is moveable between open and closed positions, includes a hinge assembly adjustably mountable between a front portion of the hood and the vehicle frame and at least one ball and socket assembly. The at least one ball and socket assembly has a ball member secured to one of a portion of the cab and a rear portion of the hood and a socket secured to the other of the portion of the cab and the rear portion of the hood. The ball member is receivable within the socket when the hood is moved into the closed position. An interior surface of the socket guides the ball into a predetermined position within the socket to position the hood relative to the cab.

13 Claims, 6 Drawing Sheets

(56) References Cited

U.S. PATENT DOCUMENTS

| | | |
|---|---|---|
| 6,719,077 B2 | 4/2004 | Connett |
| 7,036,618 B2 | 5/2006 | Telford |
| 7,416,038 B2 | 8/2008 | Etzler |
| 7,766,402 B2 * | 8/2010 | Schmidt et al. ............... 293/117 |
| 7,871,118 B2 * | 1/2011 | Stahl .......................... 296/146.4 |
| 2002/0166707 A1 | 11/2002 | Palenchar |
| 2003/0155162 A1 | 8/2003 | Sorvari |
| 2009/0167058 A1 * | 7/2009 | Chen et al. ............... 296/190.07 |
| 2009/0294196 A1 * | 12/2009 | Stahl .......................... 180/69.21 |
| 2011/0115260 A1 | 5/2011 | Mizuta |
| 2013/0025954 A1 * | 1/2013 | Miller et al. ............... 180/69.21 |

\* cited by examiner

HOOD MOUNT ASSEMBLY

CROSS-REFERENCE TO RELATED APPLICATION

This application claims the benefit of U.S. Provisional Application No. 61/511981, filed Jul. 26, 2011, the disclosure of which is hereby expressly incorporated by reference.

BACKGROUND

Heavy-duty vehicles, such as Class 8 trucks, typically include a chassis, an engine engaged on the chassis, a radiator and grill mounted on the chassis in front of the engine, a hood for enclosing the engine, and a cab mounted on the chassis. It is often desirable to have an air suspension system or other suitable system that allows the cab to move independently of the chassis to provide the driver and passengers with added comfort. More specifically, the cab normally moves fore and aft and up and down relative to the chassis in response to changing conditions on the road.

Depending on the type of hood used, the hood may be mounted at its forward end to either the radiator or the forward end of the chassis, and the hood may be mounted at its rear end to a portion of the cab. Conventional heavy duty trucks have a large, engine-covering hood which tilts about a transverse pivot point located above the forward end of the chassis to expose the engine for servicing.

In a typical installation of a hood on a heavy duty vehicle, the hood is secured to the vehicle frame after properly positioning the hood on the vehicle frame such that the hood to cab cowl gap is within predetermined standards. However, the hood must be secured to the cab to accommodate the fore and aft movement of the cab (due to the cab air suspension) without requiring an undesirably large hood to cowl gap.

Fixed connections between the chassis and the cab (through the hood) prevent the fore and aft cab movement and the up and down cab movement required of the cab suspension system. Thus, it is desirous to have a hood mounting system that secures the hood to the cab in a manner that has an appropriate hood to cab cowl gap and that accommodates the movement of the cab relative to the hood and chassis.

SUMMARY

A hood mount assembly for positioning and mounting a hood to a vehicle having a frame and a cab, wherein the hood is moveable between open and closed positions, includes a hinge assembly adjustably mountable between a front portion of the hood and the vehicle frame and at least one ball and socket assembly. The at least one ball and socket assembly has a ball member secured to one of a portion of the cab and a rear portion of the hood and a socket secured to the other of the portion of the cab and the rear portion of the hood. The ball member is receivable within the socket when the hood is moved into the closed position. An interior surface of the socket guides the ball into a predetermined position within the socket to position the hood relative to the cab.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of the present disclosure will become more readily appreciated by reference to the following detailed description, when taken in conjunction with the accompanying drawings, wherein.

DETAILED DESCRIPTION

Figure 1:
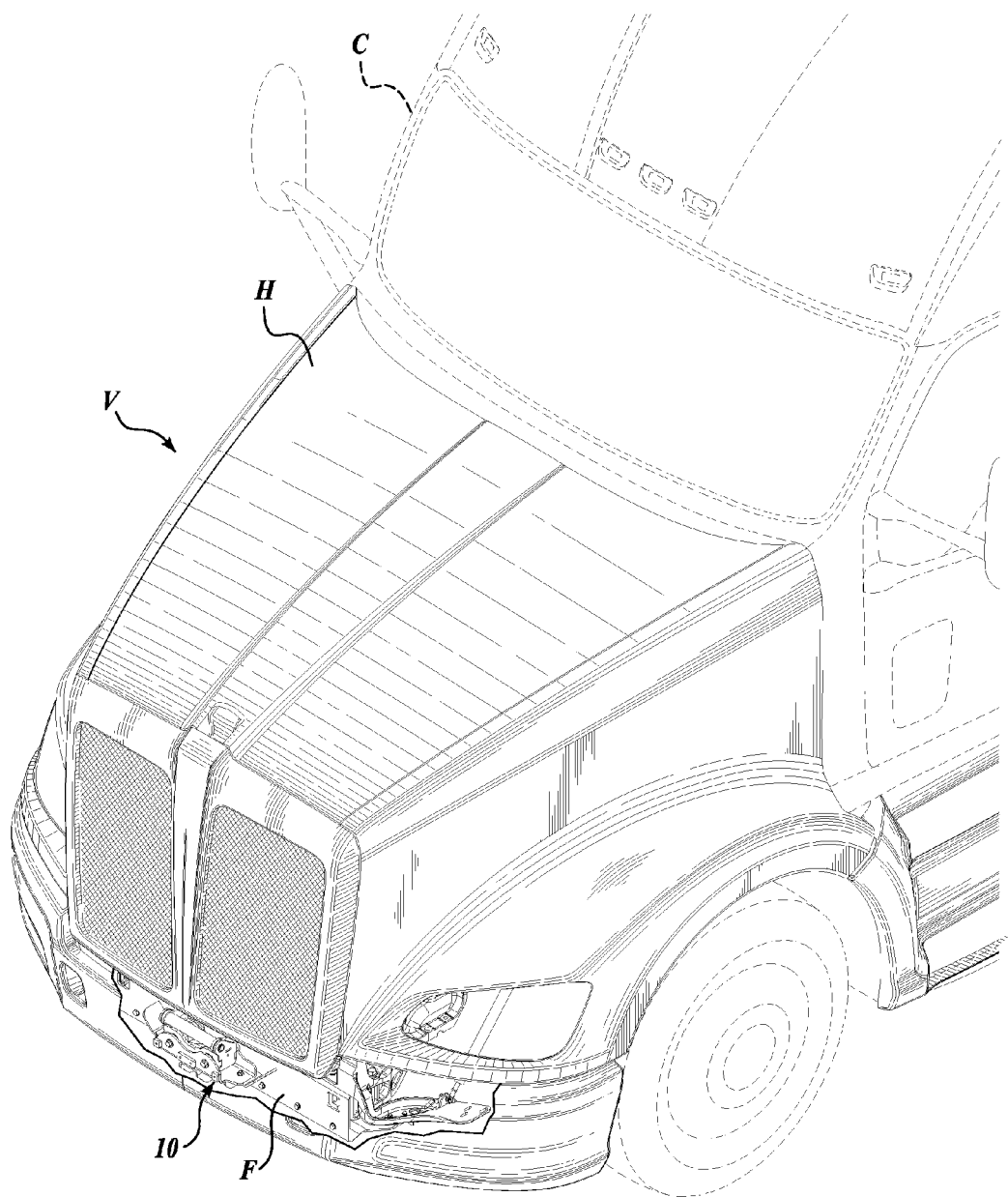
FIG. 1 is a front isometric environmental view of a portion of a vehicle having a hood mount assembly formed in accordance with a preferred embodiment of the present disclosure.
Figure 2:
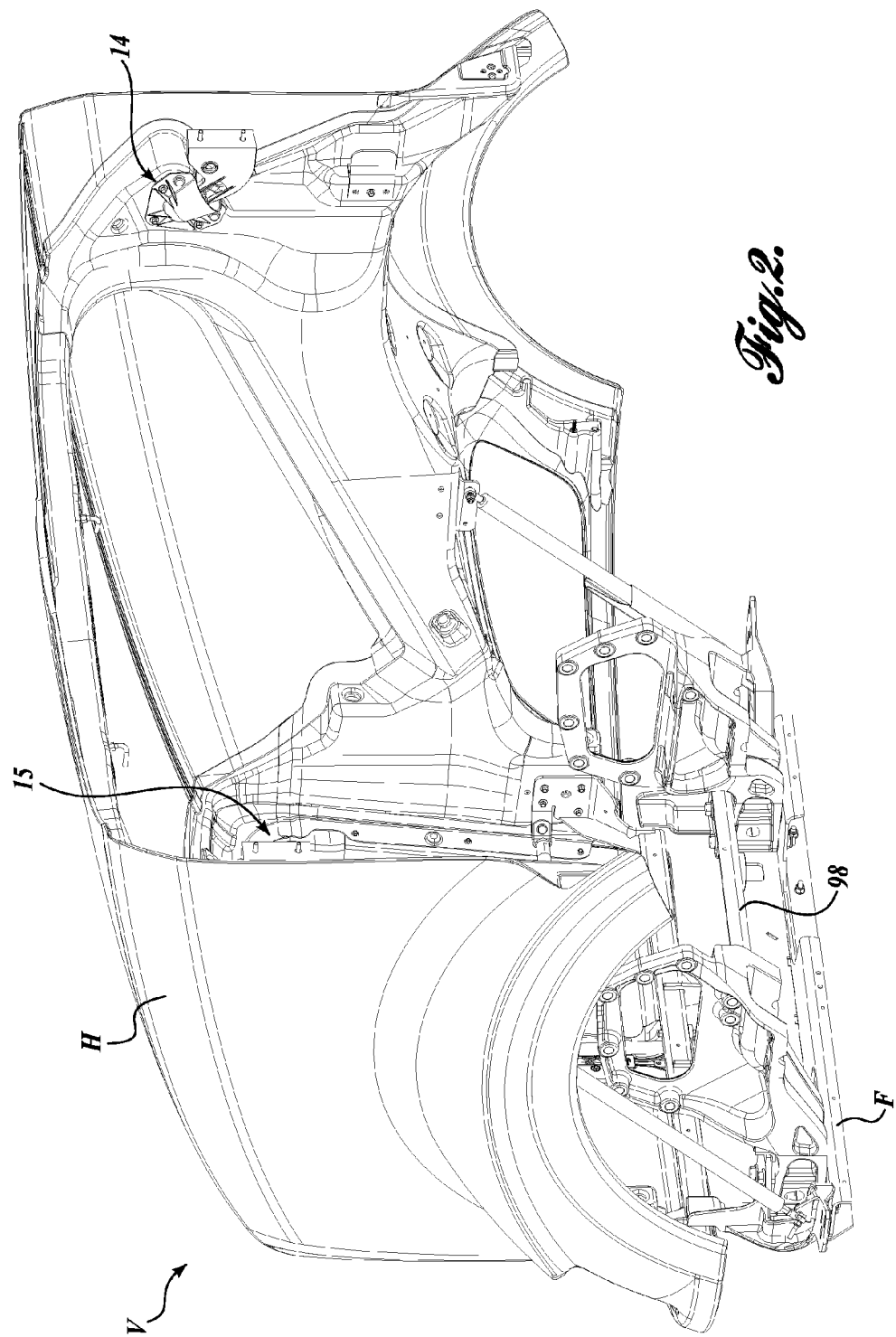
FIG. 2 is a rear isometric environmental view of a portion of a vehicle having a hood mount assembly formed in accordance with a preferred embodiment of the present disclosure.

A hood mount assembly constructed in accordance with one embodiment of the present disclosure is best seen by referring to FIGS. 1 and 2. The hood mount assembly is shown in use with a portion of vehicle V having a chassis or frame F (only partially shown), a cab C mounted to the frame F, and a hood H positioned adjacent the cowl of the cab C and mounted to the frame F. The hood mount assembly is used to pivotally and adjustably mount the hood H to frame F at its forward portion and to adjustably mount the hood H to the cab C at its rearward portion while accommodating vibrations and movements of the cab C relative to the frame F. It should be appreciated that any preferred hood and cab design may be used; and, therefore, the hood H and cab C shown in FIGS. 1 and 2 should be seen as illustrative only and should not be taken as limiting the scope of the present disclosure.

Moreover, from time to time terminology, such as "front," "rear," "forward," "rearward," etc., may be used in describing the components of the hood mount assembly. Such terms should be construed as merely descriptive and not limiting. Further, although certain geometric shapes may be illustrated and described below, it should be understood that such terms are intended to be merely descriptive and not limiting. Hence, other geometric shapes, such as oval, round, square, etc., are also within the scope of the present disclosure.

Referring specifically to FIG. 1, the hood mount assembly generally includes a hinge assembly 10 mountable between a front portion of the vehicle frame F and the hood H for adjustably mounting the hood H to the frame F and for allowing the hood H to pivot between open and closed positions. The hinge assembly 10 defines a first point of attachment of the hood H to the frame F. Referring specifically to FIG. 2, the hood mount assembly 10 further includes first and second ball and socket assemblies 14 and 15 (the second ball and socket assembly 15, is shown only partially in FIG. 2) disposed between the hood H and the cowl of the cab C (not shown in FIG. 2) for securing the hood H in the closed position and for positioning the hood H relative to the cab C. The ball and socket assemblies 14 and 15 define a two-point attachment of the rear portion of the hood H to the cab C. Thus, the hood mount assembly defines a three-point attachment system for adjustably securing the hood H to the vehicle V.

Figure 3:
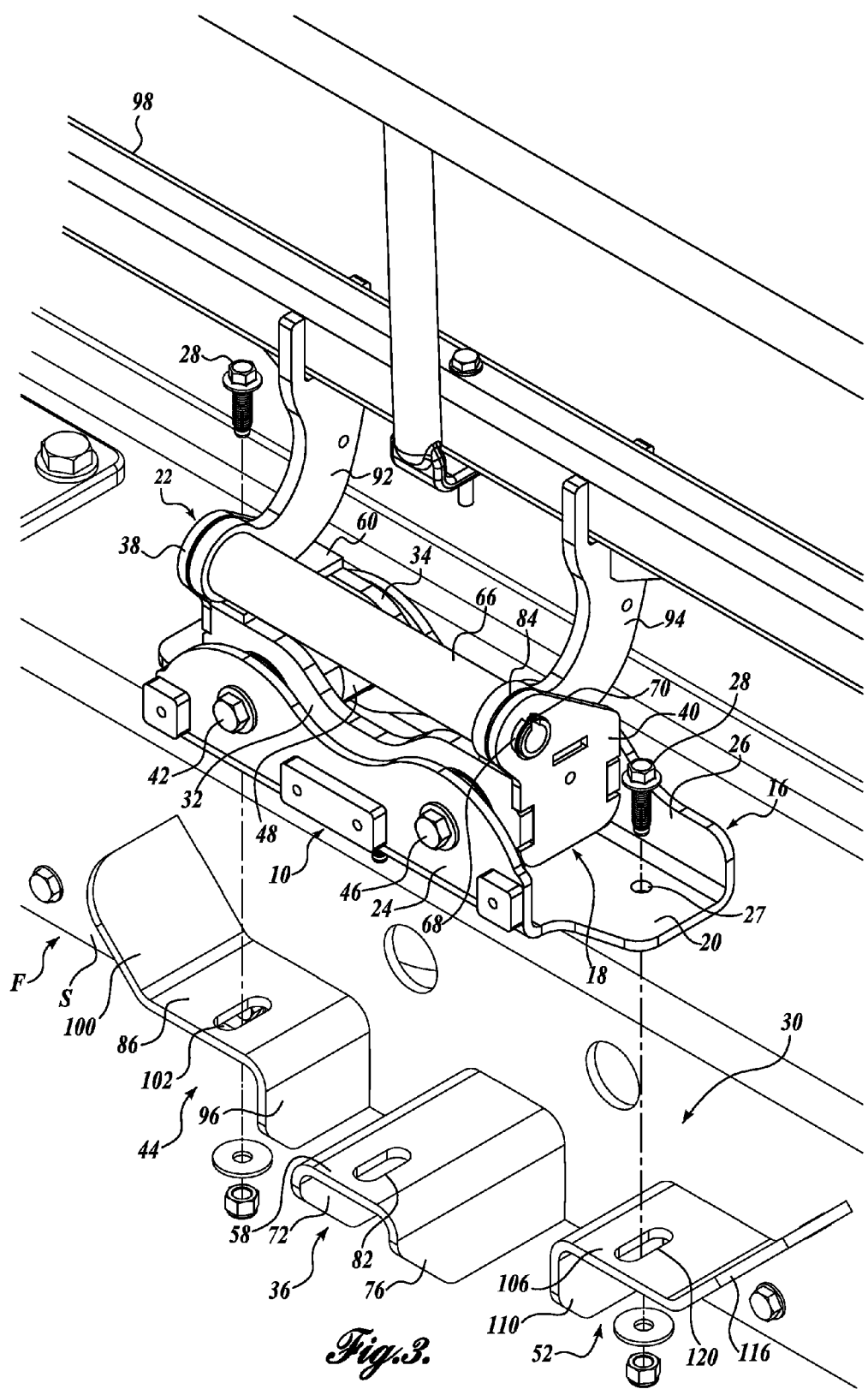
FIG. 3 is an isometric view of a hinge assembly of the hood mount assembly of FIGS. 1 and 2 shown partially exploded.
Figure 4:
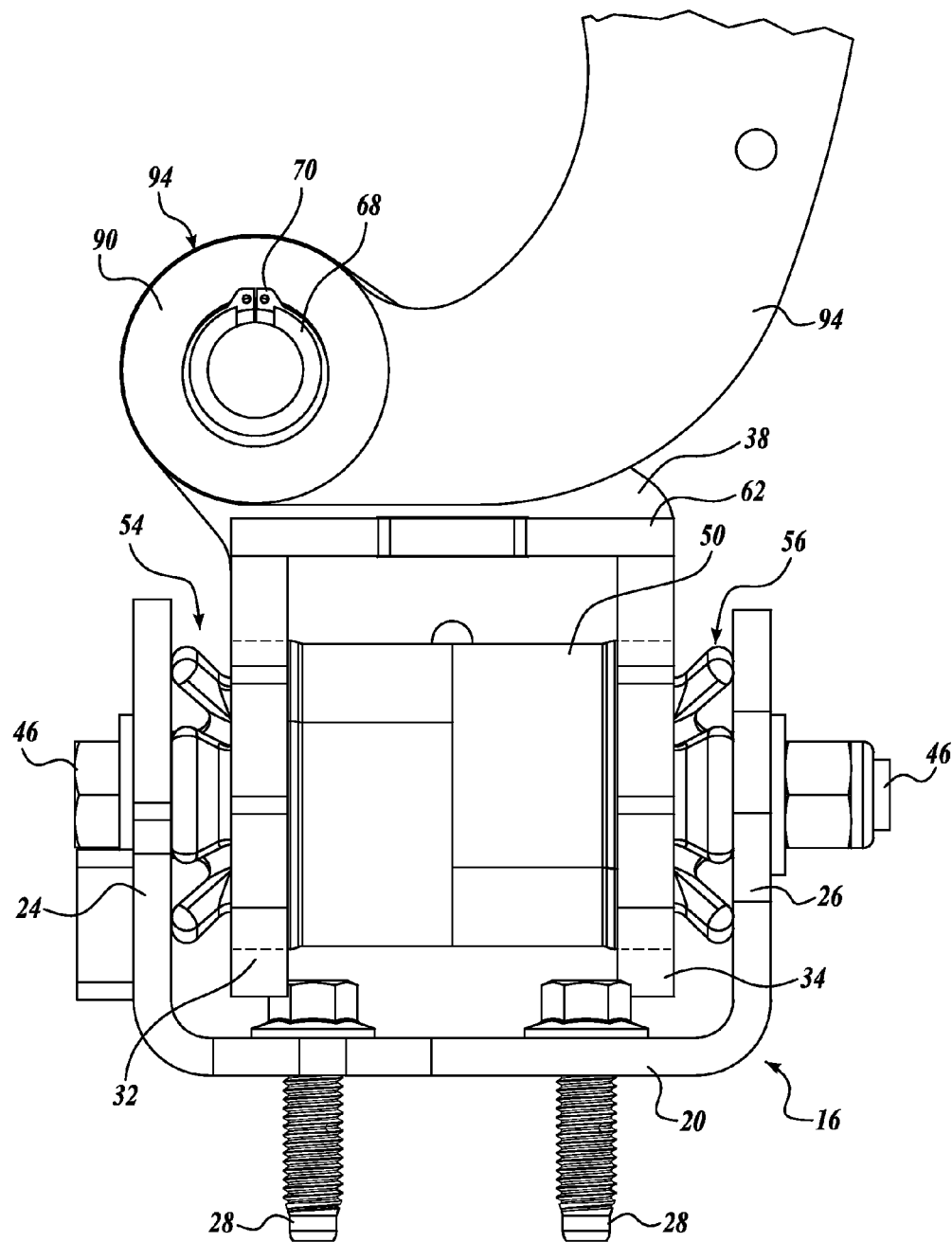
FIG. 4 is a cross-sectional view of the hinge assembly of FIG. 3.
Figure 5:
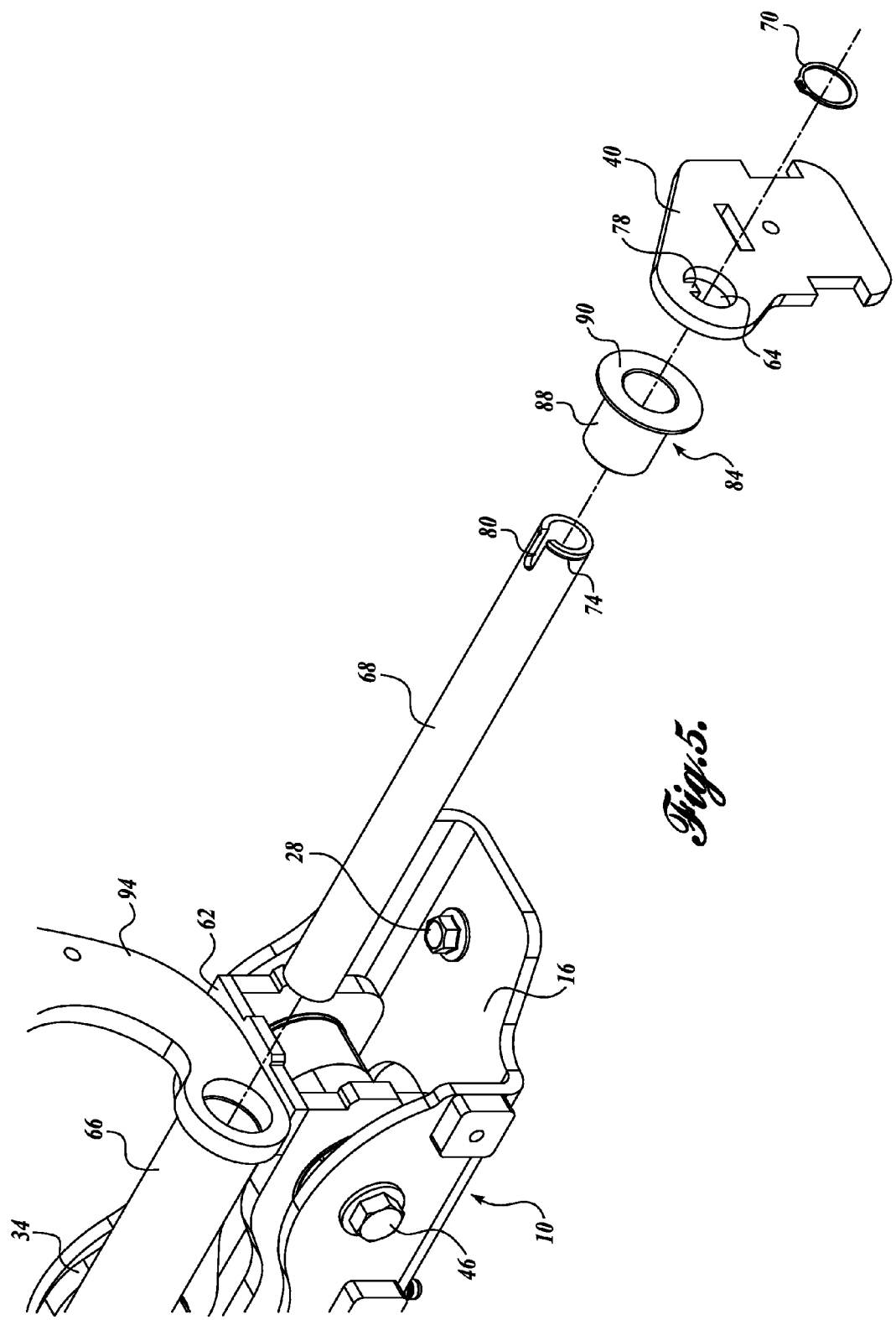
FIG. 5 is an exploded view of a portion of the hinge assembly of FIG. 3.

Referring to FIGS. 3-5, the hinge assembly 10 for pivotally and adjustably securing the hood H to the vehicle frame F will now be described in detail. The hinge assembly 10 includes a hood mount bracket 16 for adjustably securing the hood H to the frame F. Referring specifically to FIGS. 3 and 4, the hood mount bracket 16 is substantially U-shaped in cross-section and defines a horizontal portion 20 extending between the lower edges of substantially transverse, opposing first and second vertical portions 24 and 26.

The horizontal portion 20 of the hood mount bracket 16 is adjustably securable to the vehicle frame F through a flange assembly 30 (not shown in FIG. 4 for clarity). The flange assembly 30 is configured to provide a mounting surface for the hood mount bracket 16 while at the same time providing structure to help align and position the hood mount bracket 16, and therefore the hood H, relative to the cab C.

The flange assembly 30 includes a middle flange 36 secured to a portion of the vehicle frame F and first and second side flanges 44 and 52 secured to a portion of the frame F on each side of the middle flange 36. The middle flange 36 is secured to a substantially vertical surface S of the frame F such that the middle flange 36 extends substantially transversely outwardly therefrom. The middle flange 36 may be formed with or otherwise secured to the substantially vertical surface S of the frame F in any suitable manner, such as by welding. The middle flange 36 includes a substantially horizontal portion 58 and opposing first and second vertical side supports 72 and 76 extending downwardly from the lateral edges of the horizontal portion 58. The substantially horizontal portion 58 includes a middle elongated opening or slot 82 adapted to adjustably receive a fastener therein.

The first side flange 44 is secured to the substantially vertical surface S of the frame F such that the first side flange 44 extends substantially transversely outwardly therefrom. The first side flange 44 may be formed with or otherwise secured to the substantially vertical surface S of the frame F in any suitable manner, such as by welding.

The first side flange 44 includes a first substantially horizontal portion 86 having a first side elongated opening or slot 102 adapted to adjustably receive a fastener therein. A first vertical side support 96 extends downwardly from an inner lateral edge of the horizontal portion 86 closest to the middle flange 36. A first guide plate 100 extends upwardly at about a forty-five degree (45°) angle from the opposite outer lateral edge of the first horizontal portion 86, away from the middle flange 36.

The first and second side flanges 44 and 52 are substantially identical and mirror one another. Therefore, the second side flange 52 similarly includes a second substantially horizontal portion 106 having a second side elongated opening or slot 120 adapted to adjustably receive a fastener therein. A second vertical side support 110 extends downwardly from an inner lateral edge of the horizontal portion 106 closest to the middle frame flange 36. A second guide plate 116 extends upwardly at about a forty-five degree (45°) angle from the opposite outer lateral edge of the second horizontal portion 106, away from the middle flange 36.

The first and second guide plates 100 and 116 help guide the hood mount bracket 16 down into position on the horizontal portions 58, 86, and 106 of the middle and side flanges 36, 44, and 52, respectively. As noted above, the first and second side flanges 44 and 52 substantially minor one another such that the guide plates 100 and 116 of each side flange 44 and 52 extend outwardly away from the middle flange 36. As such, when the hood mount bracket 16 is lowered down onto the middle and side flanges 36, 44, and 52 during assembly, the horizontal portion 20 of the hood mount bracket 16 engages one or both of the guide plates 100 and 116 and is guided down into engagement with the horizontal portions 58, 86, and 106. The engagement of the hood mount bracket 16 with the guide plates 100 and 116 also provides a tactile sensation to the operator when installing the hood that the hood is being lowered into the appropriate position.

With the horizontal portion 20 of the hood mount bracket 16 resting on the horizontal portions 58, 86, and 106 of the middle and side flanges 36, 44, and 52, respectively, the slots 82, 102, and 120 may be aligned with openings 27 (only one opening 27 is shown in FIG. 3) in the horizontal portion 20 of the hood mount bracket 16. With the openings 27 aligned with the slots 82, 102, and 120, fasteners 28, such as bolts, may be passed therethrough, and a nut may be loosely threaded onto the end of the fasteners 28 to adjustably secure the hood mount bracket 16 to the flange assembly 30. In this adjustable position, the position of the hood H relative to the cab C may be adjusted to obtain an acceptable gap between the hood and the cab (before the nuts are tightened onto the fasteners 28).

Referring still to FIGS. 3 and 4, the hinge assembly 10 further includes a bushing assembly 18 received within the U-shaped hood mount bracket 16 for moveably securing the hood H to the frame F. The bushing assembly 18 includes a bracket assembly defined by first and second opposing bushing brackets 32 and 34. The first and second opposing bushing brackets 32 and 34 are secured together at their lateral edges and are spaced apart by first and second transverse end brackets 38 and 40 (wherein the second transverse end bracket 40 is removed in FIG. 4 for clarity) and first and second transverse top brackets 60 and 62, which are substantially transverse to the first and second transverse end brackets 38 and 40. The brackets 32 and 34, 38 and 40, and 60 and 62 of the bracket assembly are secured to one another in any suitable manner. For instance, the brackets may include correspondingly shaped slots or protrusions that can be mated together. In the alternative, the brackets may be secured together by welding, through fasteners, or by other suitable means.

The first and second bushing brackets 32 and 34 are secured within the hood mount bracket 16 in a spaced, substantially parallel relationship to the vertical portions 24 and 26 of the hood mount bracket 16. In the depicted embodiment, first and second bushing bolts 42 and 46 extend substantially transversely through the first and second opposing bushing brackets 32 and 34 and are secured within corresponding openings in the first and second vertical portions 24 and 26 of the hood mount bracket 16 with a nut or similar device (not labeled). The axes of the first and second bushing bolts 42 and 46 are in substantial alignment with the fore/aft axis of the vehicle.

First and second bushings 48 and 50 are slidably received axially on the first and second bushing bolts 42 and 46. The first and second bushings 48 and 50 are positioned axially on the bolts 42 and 46 between the first and second bushing brackets 32 and 34, respectively. Opposing ends of each the first and second bushings 48 and 50 are secured within substantially aligned openings in the first and second bushing brackets 32 and 34.

As such, the first and second bushing brackets 32 and 34 are spaced in a substantially parallel relationship to one another and are slidably received on the first and second bushing bolts 42 and 46 through the first and second bushings 48 and 50. In this manner, the bushing assembly 18, and therefore the hood H, is moveably secured to the frame F. With the axes of the first and second bushing bolts 42 and 46 in substantial alignment with the fore/aft axis of the vehicle, the bushing assembly 18 can accommodate fore/aft movements of the hood H relative to the frame F.

To accommodate such fore/aft movements, a gap is defined between the first and second bushing brackets 32 and 34 and the vertical portions 24 and 26 of the hood mount bracket 16 (see FIG. 4). Dampening elements are also disposed between the first and second bushing brackets 32 and 34 and the vertical portions 24 and 26 to help cushion or dampen movement or vibrations transferred between the hood H and the bushing assembly 18 and between the vehicle frame F and the bushing assembly 18 during vehicle operation.

Although any suitable dampening elements may be used, in the depicted embodiment, the dampening elements are embodied as first and second bump stops 54 and 56. The first and second bump stops 54 and 56 are received on the ends of each of the first and second bushing bolts 46 and 48 between the bushing brackets 32 and 34 and the vertical portions 24 and 26 of the hood mount bracket 16. The bump stops 54 and 56 are made from a suitable material, such as rubber, to help cushion or dampen movement or vibrations. Each bump stop 54 and 56 includes finger-like deformable projections that extend between the bracket portions. In this manner, the projections may deform to accommodate movement of the bushing assembly 18 relative to the hood mount bracket 16 and to help dampen vibrations transferred therebetween. It should be appreciated that the design of the bump stops 54 and 56 are exemplary, and any suitable bump stop design and configuration may instead be used.

Referring to FIGS. 3 and 5, the hinge assembly 10 further includes a pivot assembly 22 for pivotally securing the hood H to the frame F such that the hood H may be moved between open and closed positions. The pivot assembly 22 is defined in part by a pivot tube 66 pivotally received on a pivot bar 68. The pivot bar 68 extends between the first and second transverse end brackets 38 and 40 of the bushing assembly 18. Each end of the pivot bar 68 is secured to the corresponding end bracket 38 or 40 in any suitable manner. In the depicted embodiment, the pivot bar 68 is secured within substantially aligned pivot bar openings 64 defined in each end bracket 38 and 40, and the pivot bar 68 is retained within the openings 64 with a circular spring clip 70 or similar device.

More specifically, each end of the pivot bar 68 includes an annular groove 74 that receives a spring clip 70 when the end of the pivot bar 68 protrudes through the pivot bar opening 64 in the end bracket 38 or 40. The spring clip 70 is greater in diameter in its expanded state such that it is engageable with the exterior surface of the end bracket 38 or 40 to prevent the pivot bar 70 from sliding axially inwardly. It should be appreciated that the pivot bar 68 may instead be retained within the end brackets 38 and 40 in any other suitable manner.

As noted above, the pivot tube 66 is pivotally received on the pivot bar 68. In that regard, the pivot bar 68 is fixedly secured within the openings 64 in the end brackets 38 and 40 such that the pivot bar 68 cannot rotate about its longitudinal axis within the openings 64. The pivot bar 68 may be fixedly secured within the end brackets 38 and 40 in any suitable manner. In the depicted embodiment, a key protrusion 78 formed on each end bracket 38 and 40 extends radially inwardly into the pivot bar opening 64. The key protrusion 78 is mateable with a slot 80 extending axially inwardly from an end of the pivot bar 68 along a portion of the pivot bar 68. The interface of the key protrusion 78 and the slot 80 prevents the pivot bar 68 from rotating within the pivot bar opening 64.

With the pivot bar 68 fixed in its position, the pivot tube 66 may rotate or pivot about the longitudinal axis of the pivot bar 68. To help facilitate such movement, a bushing or plane bearing 84 may be disposed between the pivot tube 66 and the pivot bar 68. The plane bearing 84 may be any suitable bearing or bushing configuration suitable for minimizing friction between the pivot tube 66 and the pivot bar 68.

As can be seen in FIG. 5, the bearing 84 includes a sleeve portion 88 and a transverse end portion 90 defined at one end of the sleeve portion 88. The sleeve portion 88 is of a diameter such that it is receivable within the interior of the pivot tube 66 and it is receivable on the exterior of the pivot bar 68. The transverse end portion 90 protrudes from the interior of the pivot tube 66 such that it is disposed between the end of the pivot tube 66 and the interior surface of the end bracket 40. In this manner, the pivot tube 66 can rotate in a substantially unrestricted manner relative to the pivot bar 68 and the end bracket 40.

Referring back to FIG. 3, the pivot assembly 22 further includes first and second pivot brackets 92 and 94 extending in a generally radial outward direction from opposite ends of the pivot tube 66. The pivot brackets 92 and 94 are integrally formed with or otherwise secured to the pivot tube 66 such that they move with the pivot tube 66 about the longitudinal axis of the pivot bar 68.

The pivot brackets 92 and 94 are also contoured or suitable shaped such that they extend substantially radially from the pivot tube 66 and are engageable with a portion of the hood H. In this manner, the hood H may also pivot with the pivot brackets 92 and 94 and the pivot tube 66 about the longitudinal axis of the pivot bar 68, or between the open and closed positions. The pivot brackets 92 and 94 may be secured to an interior portion of the hood in any suitable manner. In the illustrated embodiment, the pivot brackets 92 and 94 are secured to an interior hood cross-bar or frame member 98 through a suitable attachment assembly, such as with fasteners, by welding, etc.

Figure 6:
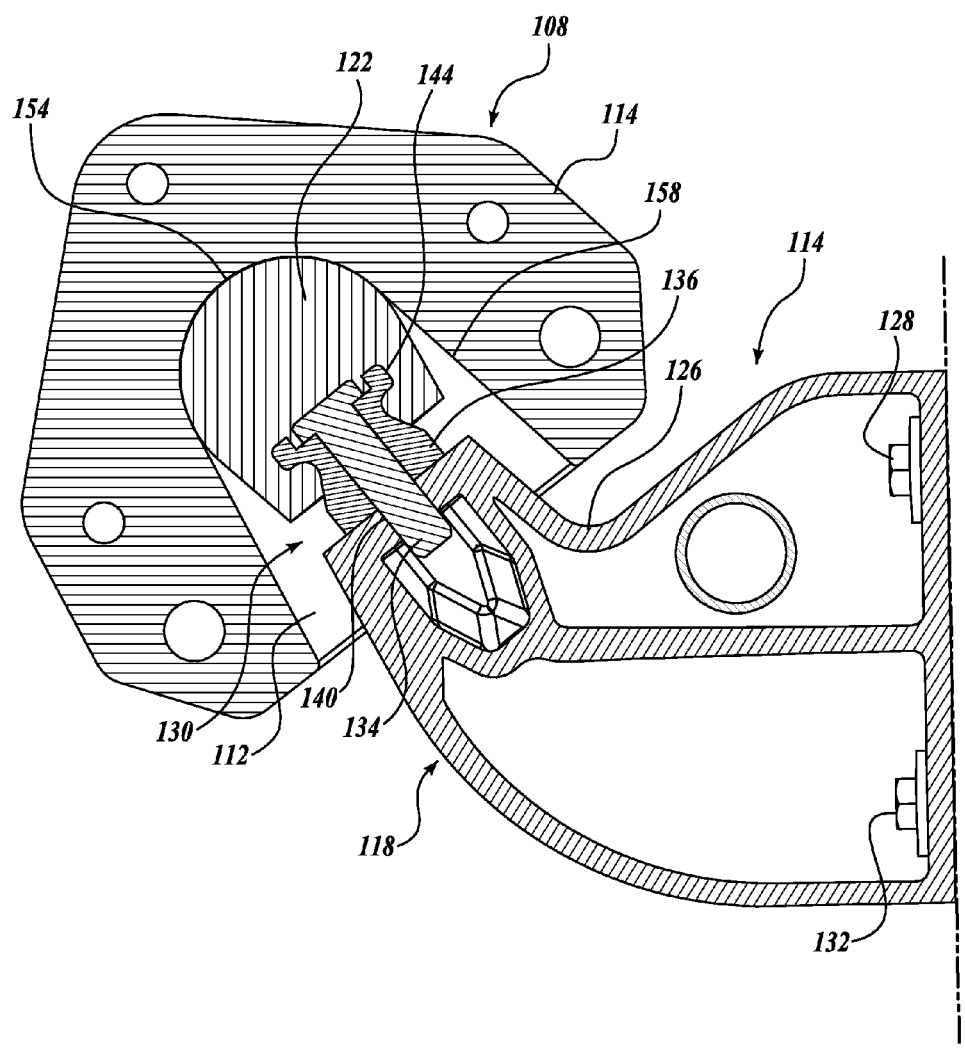
FIG. 6 is a cross-sectional view of a ball and socket assembly of the hood mount assembly of FIGS. 1 and 2.

Turning to FIGS. 2 and 6, the first and second ball and socket assemblies 14 and 15 (the second ball and socket assembly 15 is only partially shown in FIG. 2) disposed between the hood H and the cab C for securing the hood H in the closed position and for adjustably positioning the hood H relative to the cab C will now be described in detail. As noted above, the first and second ball and socket assemblies 14 and 15 define a two-point attachment of the rear portion of the hood H to the cab C. In that regard, a first ball and socket assembly 14 is located on a first side of the hood H between the hood H and the cab C, and a second ball and socket assembly 15 is located on a second side of the hood H between the hood H and the cab C. The first and second ball and socket assemblies 14 and 15 are substantially identical; therefore, only the first ball and socket assembly 14 will be illustrated and described in detail.

Referring specifically to FIG. 6, the first ball and socket assembly 14 includes a ball assembly 118 engageable with a socket assembly 108. The ball assembly 118 includes a ball 122 secured to a cab mount bracket 126. The cab mount bracket 126 is securable to a portion of the cab C in any suitable manner, such as with first and second fasteners 128 and 132. The cab mount bracket 126 is also of a suitable shape and configuration such that it positions the ball 122 for engagement with the socket assembly 108. More specifically, the cab mount bracket 126 extends outwardly and upwardly from the cab C such that it places the ball 122 in position for engagement with the socket assembly 108 when the hood H is moved into the closed position.

The ball 122 is secured to the cab mount bracket 126 through a ball attachment assembly 130. The ball attachment assembly 130 may be any suitable configuration for securely attaching the ball 122 to the cab mount bracket 126. In the embodiment depicted in FIG. 6, the ball attachment assembly 130 is defined by a fastener receptacle 140, such as a threaded opening, formed in the cab mount bracket 126. A fastener 134 extending from the ball 122 is configured to be secured within the receptacle 140 such as by tension fit, threading, etc.

The fastener 134 is secured within the ball 122 in any suitable manner. For instance, the fastener 134 may be disposed within a snap fit member 136 that is receivable within a snap-fit opening 144 in the ball 122. In that regard, the ball 122 may be formed from a suitably deformable material, such as rubber, such that it may be stretched to snap fit onto the snap fit member 136.

The ball 122 is secured to the cab mount bracket 126 with the ball attachment assembly 130 such that it is positioned to engage the socket assembly 108 when the hood H is moved into the closed position. The socket assembly 108 includes a socket 112 secured to an interior portion of the hood with a mounting plate 114 secured to or otherwise formed with an exterior surface of the socket 112.

The ball 122 is of a suitable size and shape such that it is receivable within the socket 112 with little to no gap defined between the majority of the exterior surface of the ball 122 and the interior surface of the socket 112. Moreover, as noted above, the ball 122 may be made from a somewhat deformable material, such as rubber. As such, the ball 122 can also act as a dampening element to help cushion or dampen movement or vibrations transferred between the hood H and the cab C.

The socket 112 is shaped to guide the ball 122 into engagement with an interior ball-engaging surface 154 of the socket 112 when the hood H is moved into the closed position. More specifically, the socket 112 is substantially cup-shaped to define a tapered sidewall surface 158 extending from the opening of the socket 112 towards the ball-engaging surface 154 defined at the bottom of the socket 112. As such, the ball 122 is guided into engagement with the ball-engaging surface 154 of the socket 112 to accommodate any misalignment of the hood H relative to the cab C. The position of the ball 122 within the socket 112 also positions the hood H in a predetermined position relative to the cab C.

With the hood H in this closed predetermined position, the fasteners 28 can be tightened within the openings 27 and the slots 82, 102, and 120 to secure the hood mount bracket 16 to the flange assembly 30, thereby positively and securely positioning the hood H relative to the cab C. Thus, the ball and socket assemblies 14 and 15 in combination with the adjustable fastening of the hinge assembly 10 to the vehicle frame F self-adjusts the position of the hood H relative to the cab C before securing the hood to the frame F.

It can be appreciated from the foregoing that the hood mount assembly, defined by the hinge assembly 10 and the ball and socket assemblies 14 and 15 can be used to adjustably position and secure the hood H relative to the cab C. The preferred method of installing a hood H on a vehicle F, which will be hereinafter described, involves several steps, all of which may be modified or re-ordered as needed without departing from the scope of the present disclosure.

Referring to FIGS. 1 and 3-5, the hinge assembly 10 can be used to adjustably position and secure the hood H on the vehicle frame F during assembly. The bushing assembly 18, together assembled with the pivot assembly 22, is secured within the hood mount bracket 16 in the manner described above. The hood H is also secured to the pivot assembly 22 by securing the first and second pivot brackets 92 and 94 to an interior hood frame member 98 in any suitable manner.

With the hinge assembly 10 fully assembled and secured to the hood H, the hood H is adjustably secured to the frame F by mating the hood mount bracket 16 with the flange assembly 30. More specifically, the horizontal portion 20 of the hood mount bracket 16 is engaged with horizontal portions 58, 86, and 106 of the middle and side flanges 36, 44, and 52, respectively, of the flange assembly 30. With the hood mount bracket 16 resting on the flanges 36, 44, and 52, fasteners 28 may be passed through the openings 27 in the hood mount bracket 16 and through the slots 82, 102, and 120 in the horizontal portions 58, 86, and 106. A nut can be loosely threaded onto the end of each fastener 28 to loosely and adjustably secure the hood H to the frame F.

Referring to FIGS. 2 and 6, the hood H is moved into the closed position by pivoting the hood H about the axis of the pivot bar 68. When moving the hood H into the closed position, the socket 112 of each ball and socket assembly 14 and 15 mates with the ball 122 to positively locate the hood H relative to the cab C. More specifically, the tapered sidewall surface 158 of the socket 112 guides the ball 122 into engagement with the ball-engaging surface 154 of the socket 112, thereby accommodating any misalignment between the hood H and the cab C and positioning the hood H relative to the cab C.

With the hood H in this closed, positively located position, the horizontal portion 20 of the hood mount bracket 16 is tightly secured to the horizontal portions 58, 86, and 106 of the middle and side flanges 36, 44, and 52 by tightening the nuts onto the fasteners 28. The hood H, properly positioned relative to the cab C through the hinge assembly 10 and the ball and socket assemblies 14 and 15, may then be pivoted into the open and closed positions through the pivot assembly 22.

In this closed position, the somewhat deformable material of the ball 122 helps dampen any vibrations or movement transferred between the hood H and the cab C. Moreover, the bushing assembly 18 of the hinge assembly 10 accommodates any fore and aft movement of the hood H relative to the frame F and substantially isolates any fore and aft movement to the single point connection at the hinge assembly 10. (Furthermore, the first and second bump stops 54 and 56 help dampen any vibrations transferred between the hood H and the frame F.) In this regard, the bushing assembly 18 minimizes the fore-aft loads transferred between the hood H and the vehicle frame F, thereby providing a dynamically quieter hood connection with increased durability.

Thus, the hood mounting assembly shown and described herein is used to position the hood H relative to the cab C during assembly, to pivot the hood H between open and closed positions, to accommodate fore/aft movement of the hood H, and to dampen vibrations transferred between the cab C, the hood H, and the frame F.

While illustrative embodiments have been illustrated and described, it will be appreciated that various changes can be made therein without departing from the spirit and scope of the present disclosure.

The embodiments of the present disclosure in which an exclusive property or privilege is claimed are defined as follows:

1. A hood mount assembly for positioning and mounting a hood to a vehicle having a frame and a cab, the hood moveable between open and closed positions, the assembly comprising:
   (a) a hinge assembly adjustably mountable between a front portion of the hood and the vehicle frame, the hinge assembly comprising a bushing assembly that accommodates fore and aft movement of the hood relative to the frame;
   (b) at least one ball and socket assembly, the at least one ball and socket assembly having a ball member secured to one of a portion of the cab and a rear portion of the hood and a socket secured to the other of the portion of the cab and the rear portion of the hood, the ball member receivable within the socket when the hood is moved into the closed position, wherein an interior surface of the socket guides the ball into a predetermined position within the socket to position the hood relative to the cab.

2. The assembly of claim 1, wherein the bushing assembly includes at least one dampening element configured to reduce vibrations transferred between the hood and the frame.

3. The assembly of claim 1, wherein the hinge assembly is fixedly securable to the vehicle frame in the predetermined position defined by the ball and socket assembly.

4. The assembly of claim 1, wherein the hinge assembly further comprises a pivot assembly secured to the bushing assembly and the hood to allow the hood to pivot between open and closed positions.

5. A hood mount assembly for positioning and mounting a hood to a vehicle having a frame and a cab, the hood moveable between open and closed positions, the assembly comprising:
(a) a hinge assembly disposed between a front portion of the hood and the vehicle frame, the hinge assembly comprising:
  (i) a hood mount bracket adjustably securable to a portion of the vehicle frame;
  (ii) a bushing assembly secured to the hood mount bracket, the bushing assembly having at least one bushing slidable along a bushing axis; and
  (iii) a pivot assembly secured to the bushing assembly and securable to the hood, the pivot assembly having a pivot bar moveable about a pivot bar axis for allowing the hood to pivot between open and closed positions, wherein the pivot bar axis is substantially transverse to the bushing axis;
(b) at least one ball and socket assembly, the at least one ball and socket assembly having a ball member secured to one of a portion of the cab and a rear portion of the hood and a socket secured to the other of the portion of the cab and the rear portion of the hood, the ball member receivable within the socket when the hood is moved into the closed position, wherein an interior surface of the socket guides the ball into a predetermined position within the socket to position the hood relative to the cab.

6. The assembly of claim 5, wherein the hood mount bracket is fixedly securable to the vehicle frame in the predetermined position defined by the ball and socket assembly.

7. The assembly of claim 5, wherein the hood mount bracket is adjustably and fixedly securable to a flange assembly secured to the vehicle frame.

8. The assembly of claim 5, wherein the flange assembly includes first and second guide plates extending upwardly and outwardly from the flange assembly.

9. The assembly of claim 5, wherein the hood mount bracket is engageable with the first and second guide plates to guide the hood mount bracket into a predetermined position on the flange assembly.

10. The assembly of claim 5, wherein the hood mount bracket includes a substantially horizontal portion and first and second opposing substantially vertical portions.

11. The assembly of claim 10, wherein the bushing assembly includes first and second bushings slidably received on first and second bushing bolts extending between the first and second opposing substantially vertical portions of the hood mount bracket, the first and second bushing bolts defining first and second bushing bolt axes substantially transverse to the pivot bar axis.

12. The assembly of claim 11, wherein the bushing assembly further includes first and second bushing brackets positioned substantially parallel to the first and second opposing substantially vertical portions of the hood mount bracket, the first and second bushing brackets secured to the first and second bushings.

13. The assembly of claim 12, further comprising at least one dampening element disposed between the first and second bushing brackets and the first and second opposing substantially vertical portions of the hood mount bracket.

* * * * *